United States Patent [19]
Schakel et al.

[11] Patent Number: 5,697,282
[45] Date of Patent: Dec. 16, 1997

[54] APPARATUS FOR AND METHOD OF FORMING LARGE DIAMETER DUCT WITH LINER AND THE PRODUCT FORMED THEREBY

[75] Inventors: Eric Glenn Schakel, Sedalia; Robert Ronald Coleman, Westminster; Kent Russell Matthews, Littleton, all of Colo.

[73] Assignee: Schuller International, Inc., Denver, Colo.

[21] Appl. No.: 213,351

[22] Filed: Mar. 15, 1994

[51] Int. Cl.⁶ .................................................. B26D 3/06
[52] U.S. Cl. .......................... 83/876; 83/884; 83/887; 83/664; 83/665; 83/563; 83/100
[58] Field of Search ........................ 83/884, 879, 887, 83/875, 876, 835, 664, 665, 563, 564, 100; 493/355, 399, 401, 402, 397

[56] References Cited

U.S. PATENT DOCUMENTS

| | | | |
|---|---|---|---|
| 737,194 | 8/1903 | Armstrong | 83/664 |
| 2,058,680 | 10/1936 | Gorsline et al. | |
| 2,155,889 | 4/1939 | Branson | |
| 2,791,248 | 5/1957 | Beale | 83/835 |
| 2,912,021 | 11/1959 | Gommel | 83/665 |
| 3,135,151 | 6/1964 | Link et al. | 83/100 X |
| 3,675,526 | 7/1972 | Bush | 83/835 X |
| 3,863,530 | 2/1975 | Weidman | 83/875 X |
| 3,875,835 | 4/1975 | Roberts | |
| 4,554,851 | 11/1985 | Elhaus | 83/563 X |
| 4,576,206 | 3/1986 | Lauren | |
| 4,958,546 | 9/1990 | Yoshida et al. | 83/835 X |
| 5,004,018 | 4/1991 | Bainbridge | |

FOREIGN PATENT DOCUMENTS

| | | | |
|---|---|---|---|
| 24 60 728 | 6/1976 | Germany | 83/876 |
| 54-66988 | 5/1979 | Japan | 83/100 |
| 2230489 | 10/1990 | United Kingdom | |
| 9218330 | 10/1992 | WIPO | |

*Primary Examiner*—Rinaldi I. Rada
*Assistant Examiner*—Boyer Ashley

[57] ABSTRACT

A duct insulation board grooving apparatus cuts a plurality of parallel grooves into duct boards with a plurality of rotary saw blades which are spaced on 1.57 inch or 3.14 inch centers. The saw blades have peripheral teeth which project outwardly on both sides of the saw blades to form grooves in a first major surface of a duct board which are wider than the saw blades. The grooves have sidewalls which extend perpendicular to the first major surface of the duct board and have a depth from 70% to 90% of the thickness of the duct board. The first major surface is typically coated and a second major surface of the duct board normally has a facing adhered thereto. After the duct board is grooved, the duct board can be curved to conform to the curvature of a tubular metal shell, with the parallel grooves of the duct board extending parallel to the axis of curvature, and placed in the tubular metal shell as a liner to form an insulated air duct.

16 Claims, 3 Drawing Sheets

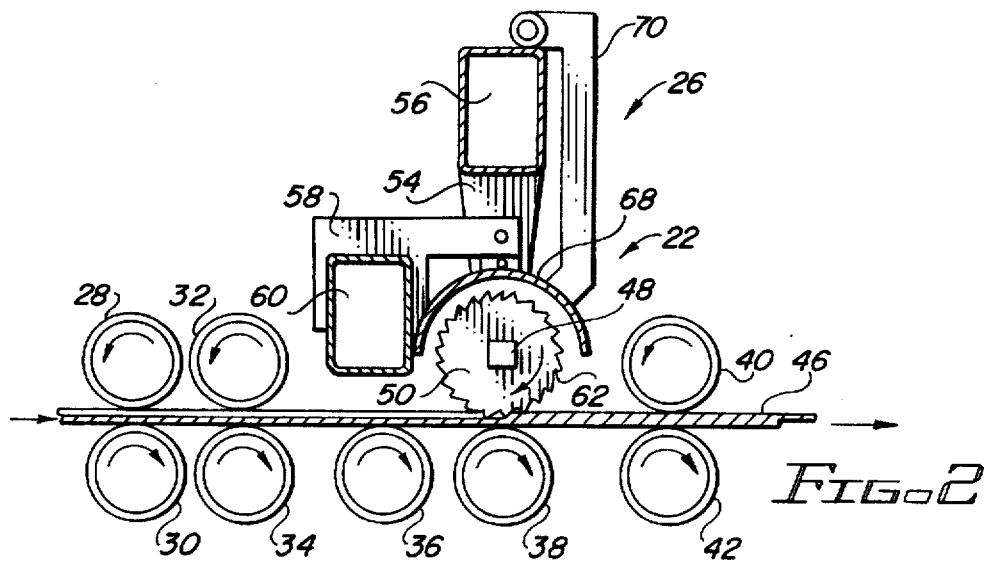
FIG. 2
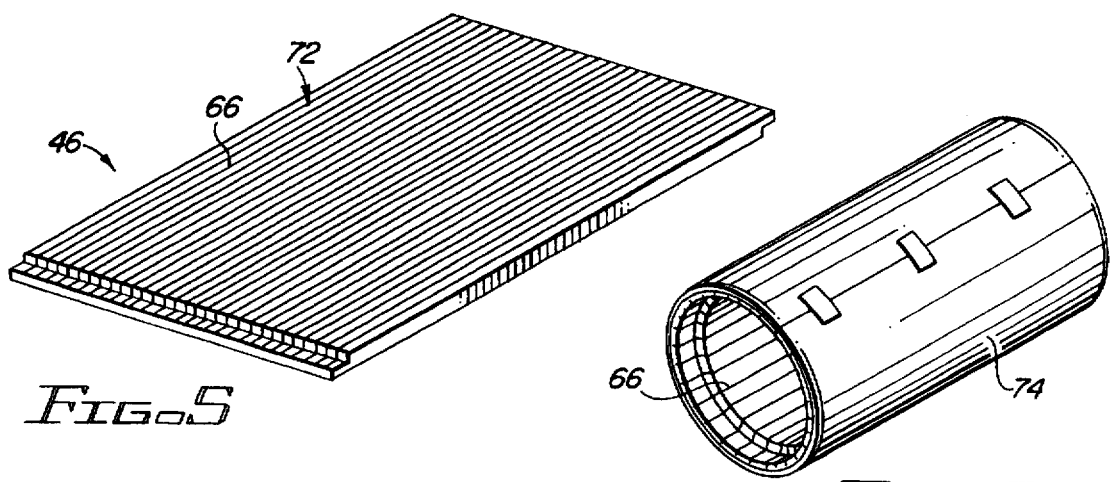
FIG. 5
FIG. 6
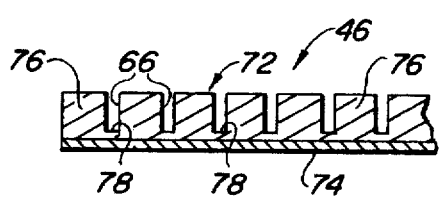
FIG. 7
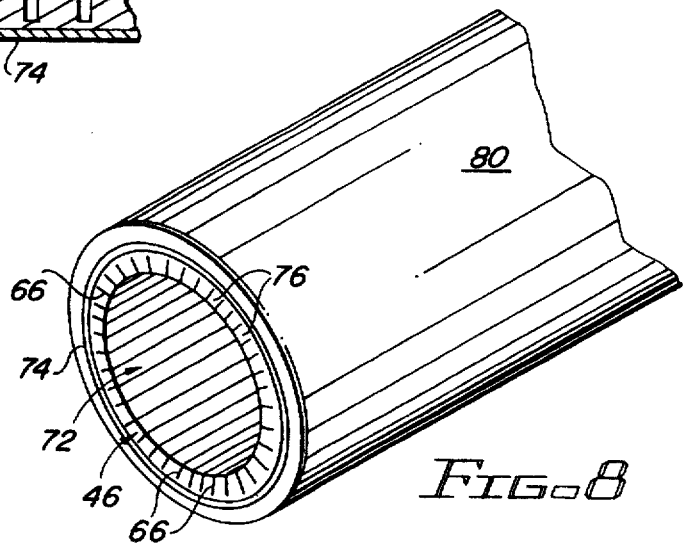
FIG. 8

5,697,282

APPARATUS FOR AND METHOD OF FORMING LARGE DIAMETER DUCT WITH LINER AND THE PRODUCT FORMED THEREBY

BACKGROUND OF THE INVENTION

The present invention is directed to an apparatus for and a method of cutting a plurality of grooves in faced duct insulation boards (glass fiber or foam duct insulation boards) and forming the grooved, faced duct insulation boards into tubular liners which can be used to internally line large diameter round and flat oval metal ducts and the grooved duct insulation boards and the large diameter ducts formed thereby.

Heating, ventilating and air conditioning systems found in large building structures, such as, convention centers, sports domes, etc., require large diameter, high capacity, insulated round or flat oval air ducts for conveying conditioned air from air conditioning units to locations throughout the building structure and for returning air to the air conditioning units for heating or cooling and recirculation. These large diameter, insulated round or flat oval air ducts typically range from about twenty inches to over one hundred inches in diameter.

Presently, the most commonly used internally treated, air ducts for such large, high capacity heating, ventilating and air conditioning systems are double wall insulated metal ducts, such as, the air duct 100 shown in FIG. 11. These large diameter, high capacity, metal air ducts 100 comprise an outer tubular metal shell 102, an inner tubular metal liner 104 (which is typically perforated), and one or more layers of glass fiber or other insulation 106 intermediate the outer tubular shell and the inner tubular liner. These tubular air ducts normally have either a round or a flat oval transverse cross section. Due to their construction, which in essence, comprises a first tubular metal duct contained within a second tubular metal duct, and the labor required to both assemble the first metal duct within the second metal duct and insulate the space between the ducts, these double wall, insulated metal air ducts are costly.

A second insulated air duct 110, currently in use, is shown in FIG. 12. This insulated air duct 110 comprises a round, tubular metal shell 112 internally lined with a round tubular, preformed, self-supporting, molded, glass fiber insulation 114 sold by Schuller International Inc., under the trademark "SPIRACOUSTIC". This air duct system exhibits good thermal and acoustical insulating properties and eliminates the need for the costly perforated metal liner 104 of the air duct 100. However, this system has only been used with tubular metal shells having internal diameters of twenty-four inches or less.

Recently, large diameter, high capacity, air ducts, comprising tubular metal shells lined with coated, glass fiber duct boards, were installed in a high capacity heating, ventilating and air conditioning system. By eliminating the inner tubular metal liner 104 of the double wall, insulated metal air ducts 100 and the labor involved in assembling the tubular metal liner 104 within the outer tubular metal shell 102, the cost of the large diameter, high capacity air duct used in the heating, ventilating and air conditioning system was reduced.

The elimination of the inner tubular metal liner was accomplished by forming a plurality of parallel grooves or kerfs in the airstream surfaces of the duct boards that enabled the duct boards to be curved (about an axis parallel to the grooves or kerfs) to conform to the interior surfaces of the tubular metal shells. The glass fiber duct boards were four feet wide by ten feet long. Where the tubular metal shell being lined had an internal circumference equal to or less than the length of the duct board, the duct board or a portion of the duct board was formed into a tube and inserted into the tubular metal shell to form the insulated air duct. Where the tubular metal shell had an internal circumference greater than the length of one duct board, a first duct board was taped to a second duct board or portion of a duct board to obtain the required length, the joined duct boards were then formed into a tube, and the tube was inserted into the tubular metal shell to form the insulated air duct.

The parallel grooves or kerfs cut into the airstream surfaces of the duct boards were narrow and had sidewalls extending substantially perpendicular to the airstream surfaces. The airstream surfaces of the duct boards were coated to encapsulate the fibers and/or particles of the duct boards within the duct boards. By forming narrow grooves with substantially perpendicular sidewalls in the airstream surfaces, the mouths of the grooves or kerfs closed when the duct boards were curved to conform to the interior surfaces of the tubular metal shells thereby keeping the fibers in the groove or kerf surfaces from being exposed to the interior of the air ducts and the high velocity air stream being conveyed through the air ducts. Vee grooves did not close when the duct boards were curved to conform to the interior surface of the tubular metal shells, exposing fibers in the groove surfaces. Accordingly, vee grooves were not used in the duct boards.

A duct board grooving apparatus using a plurality (thirty or more) of evenly spaced rotatably driven, saw blades was used to cut the grooves or kerfs in the airstream surfaces of the duct boards. The saw blades were mounted on a drive shaft and manually spaced along the drive shaft. The drive shaft had a round transverse cross section. Accordingly, after the saw blades were manually spaced along the drive shaft, the saw blades had to be affixed to the drive shaft by set screws so that the saw blades would rotate with the drive shaft and maintain their axial spacing.

To groove duct boards for lining tubular metal shells of different diameters, the spacing between the numerous saw blades was adjusted, through trial and error, until a spacing was found that allowed the duct boards to be curved to the particular curvature required for the tubular metal shell being lined. Thus, the numerous saw blades each had to be loosened, moved and reaffixed to the drive shaft, a very time consuming operation.

The saw blades used for cutting grooves or kerfs in the duct boards had peripheral teeth projecting radially outward from the saw blades in the planes of the saw blades whereby the sidewalls of the saw blades radially inward of the teeth engaged the sidewalls of the grooves or kerfs creating drag.

The saw blade drive shaft was offset from the axis of a backup roll used to support the duct boards beneath the saw blades as the grooves or kerfs were cut into the airstream surfaces of the duct boards. Accordingly, the duct boards could be deflected somewhat during the grooving operation causing a variation in the depths of the grooves formed across the lengths of the duct boards. In addition, the saw blade drive shaft was supported laterally from an existing tool bar which aggravated the deflection problem.

SUMMARY OF THE INVENTION

The present invention is directed to an improved apparatus for and method of forming grooved duct insulation boards for lining large diameter, insulated metal air ducts and the like, and to the grooved duct insulation boards and tubular air ducts formed with the grooved duct insulation boards. The duct insulation boards are coated on the airstream surface with a polymeric latex coating and have a facing, such as, a foil-scrim-kraft facing, adhesively bonded to the outer surface of duct board.

The rotary saw blades of the duct board grooving apparatus of the present invention have two settings for forming tubular air ducts ranging from sixteen inches in diameter to over one hundred inches or more in diameter. In accordance with the present invention, the saw blades are located on 1.57 inch (π/2 inch) centers for grooving duct insulation boards to form ducts ranging from sixteen to thirty inches in diameter and on 3.14 inch (π inch) centers for grooving duct insulation boards to form ducts ranging from thirty inches to one hundred inches or more in diameter. The parallel grooves or kerfs cut into the duct boards by these two settings allow the outer surfaces of the duct boards to be curved to conform to the curvatures of tubular metal shells for the diameter ranges stated above.

While the duct boards grooved in accordance with the present invention are primarily intended for lining large diameter round or flat oval tubular metal shells to form air ducts used in high capacity heating, ventilating and air conditioning systems. For low capacity systems, coated glass fiber and foam duct insulation boards, with foil-scrim-kraft or similar facings on the outside surface, can be formed directly into tubular air ducts having no outer metal shell.

By spacing the saw blades on 1.57 inch (π/2 inch) centers or 3.14 inch (π inch) centers, the parallel grooves or kerfs in the airstream surfaces of the glass fiber duct boards are spaced on 1.57 inch (π/2 inch) or 3.14 inch (π inch) centers. The grooves or kerfs define plurality of segments in the duct boards which are hinged together by the portions of duct boards remaining between the bottoms of the grooves or kerfs and the outside surfaces of the duct boards. Since these segments are pi or one half pi inches wide, the diameter of a tubular metal shell, in inches, equals the number of segments required to form a circumferential section of liner for the large diameter ducts and twice the diameter of a tubular metal shell, in inches, equals the number of segments required to form a circumferential section of liner for the smaller diameter ducts. Metallic, plastic or similar spacers are used to establish and maintain the dimensions between the saw blades.

When lining either larger diameter tubular metal shells or smaller diameter tubular metal shells, if all of the segments of a duct board are not needed to form a liner section, the remaining segments of the duct board can be used with segments from another duct board to make another liner section. If the circumference of the tubular metal shell is greater than the length of a duct board, that duct board plus segments from another duct board can be used to complete a circumferential liner section. Since the segments, for lining the larger diameter tubular metal shells are all the same width and the segments for lining the smaller diameter tubular metal shells are all the same width, segments from different duct boards (grooved for either the larger diameter or smaller diameter tubular metal shells) can be used together to form a liner section thereby eliminating waste.

The rotary saw blades used in the apparatus of the present invention have peripheral cutting teeth which alternately extend outwardly beyond the planes of the sidewalls of the saw blades. The grooves or kerfs cut by such saw blades are wider than the portions of the saw blades radially inward from the teeth. Accordingly, the sidewalls of the rotary saw blades do not engage the sidewalls of the grooves or kerfs formed by the teeth and the drag resulting from such engagement is eliminated. The power required to drive the thirty-seven to seventy-five rotary saw blades used to cut the grooves or kerfs in the duct boards is thereby reduced.

The drive shaft on which the rotary saw blades are mounted has a non-round, e.g. hexagonal or square, cross section. By forming mounting openings in the rotary saw blades and the spacers that are complementary in cross section to the cross section of the drive shaft, set screws and the like do not have to be used to affix the rotary saw blades and spacers to the shaft so that they rotate with the shaft. Thus, only two collars, located at each end of the array of rotary saw blades and held in place with set screws or support arms located at each end of the array of saw blades, are required to keep the saw blades from shifting axially along the drive shaft. This facilitates a rapid changeover from one saw blade spacing to the other when required.

The rotary saw blade cutting assembly of the present invention is located directly over and rigidly supported over a backing roll. Thus, the duct boards are consistently positioned and firmly supported beneath the rotary cutting assembly to facilitate the uniform formation of parallel grooves which are uniformly spaced across the length of the duct boards.

Many duct board contractors will desire to use the duct board grooving apparatus to groove duct boards to form rectangular ducts as well as the liners for the large diameter round and flat oval ducts. Accordingly, one embodiment of the duct board grooving apparatus of the present invention permits both the rotary saw blade cutting assembly and a stationary knife blade grooving assembly to be moved between a groove forming position and storage positions. With this construction, either assembly can be used to form grooves in the duct board being fed through the machine by merely moving one assembly into its storage position and the other assembly into the grooving position.

BRIEF DESCRIPTION OF THE DRAWINGS

FIG. 2 is a section, taken substantially along lines 2—2 of FIG. 1, of the grooving station of the duct board grooving apparatus.

FIG. 3 is a perspective view of a portion of the rotary saw blade assembly used in the grooving station.

FIG. 4 is an enlarged detail of one type of cutting teeth which can be used on the rotary saw blades.

FIG. 5 is a perspective view of a glass fiber duct insulation board of the present invention with multiple grooves or kerfs in the airstream surface.

FIG. 6 is a perspective view of a glass fiber duct insulation board of the present invention formed into a tubular duct with its edges taped together to maintain the duct board in the tubular configuration.

FIG. 7 is a partial section through a glass fiber duct insulation board grooved in accordance with the present invention.

FIG. 8 is a perspective view of an insulated metallic shell air duct of the present invention.

DESCRIPTION OF THE PREFERRED EMBODIMENTS

Figure 1:
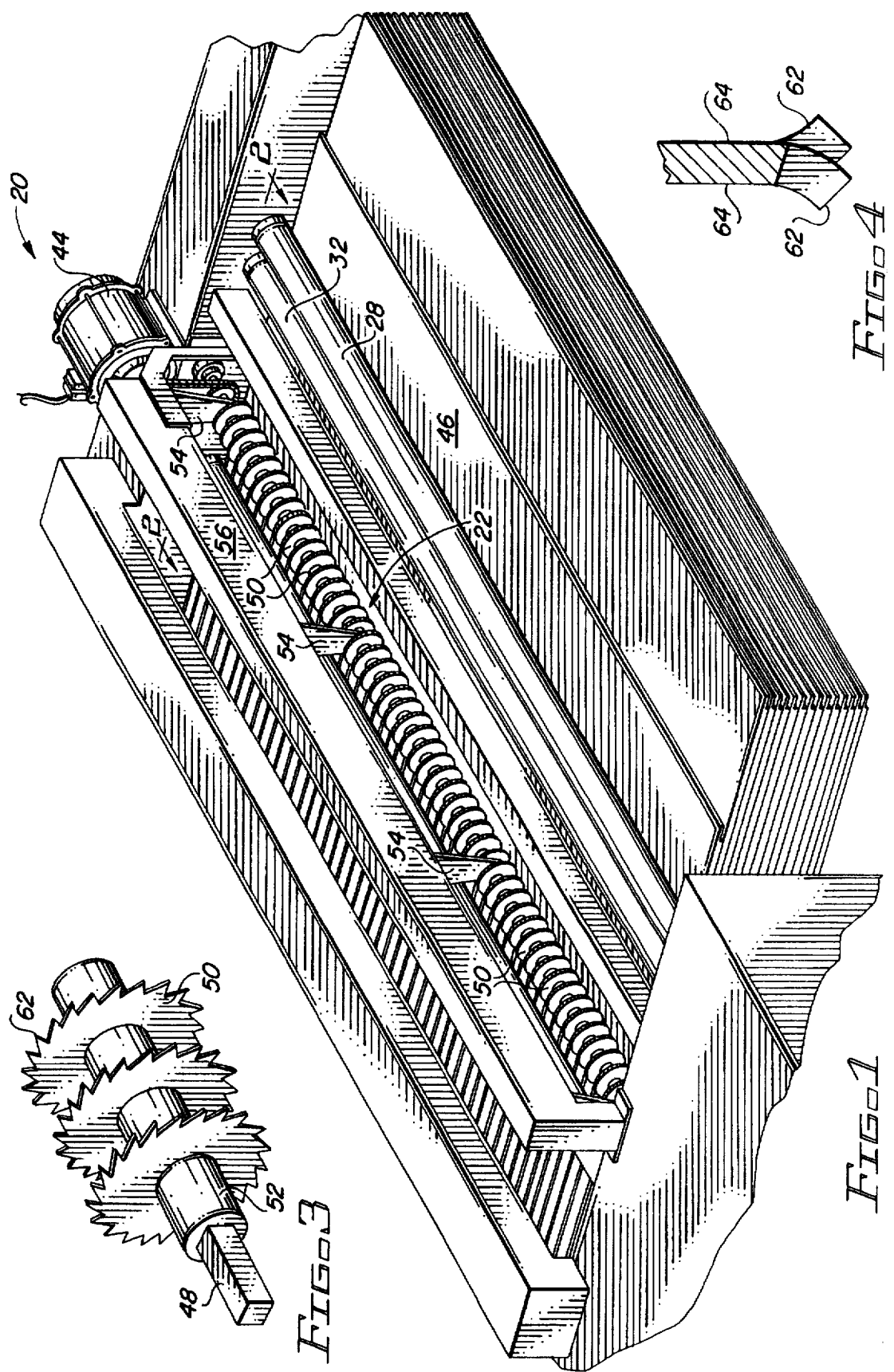
FIG. 1 is a perspective view of the duct board grooving apparatus of the present invention with the lateral support braces and the dust and fiber collection hood removed to better illustrate the rotary saw blade assembly.
Figure 11:
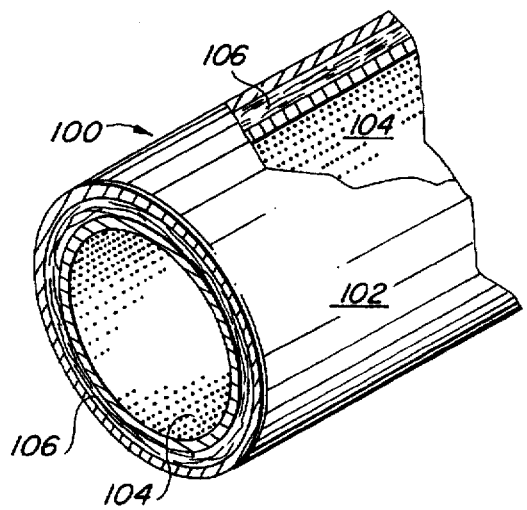
FIG. 11 is a perspective view of the double wall insulated metal ducts of the prior art.
Figure 12:
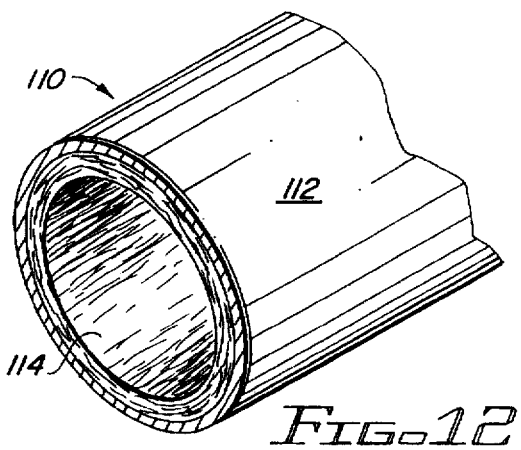
FIG. 12 is a perspective view of metal duct of the prior art with a molded glass fiber insulation liner.

As best shown in FIGS. 1 and 2, the duct board grooving apparatus 20 of the present invention is similar in construction to the duct board cutting apparatus of U.S. Pat. No. 3,875,835; issued on Apr. 8, 1975; to Johns-Manville Corporation; and entitled "Duct Board Cutting Apparatus and Method" (hereinafter the "'835 patent"); and the disclosure of this patent is hereby incorporated herein in its entirety by reference. Instead of the stationary cutting tool assemblies used in the apparatus of the '835 patent, the embodiment of the duct board grooving apparatus 20 of the present invention, shown in FIGS. 1 and 2, uses a rotary saw blade cutting assembly 22. In the embodiment of the present invention shown in FIGS. 9 and 10, the rotary saw blade cutting assembly 22 and stationary cutting tool assemblies 24 (like or similar to those illustrated in detail in FIGS. 4 and 5 of the '835 patent) can be used interchangeably. The rotary saw blade cutting assembly 22 is used to groove duct boards for lining large diameter round or flat oval metal shells to form insulated metal air ducts and the stationary cutting tool assemblies 24 are used to groove duct boards to form rectangular air ducts.

As shown in FIGS. 1 and 2, the grooving station 26 comprises two pairs of feed rolls 28, 30 and 32, 34; a guide roll 36; a backing roll 38; a pair of pull rolls 40 and 42; and the rotary saw blade cutting assembly 22 which is centered over the backing roll 36. All of the rolls are driven by a DC motor at the same speed through a conventional drive train, not shown. The rotary saw blade cutting assembly 22 is independently driven by DC motor 44.

The feed rolls 28, 30 and 32, 34 feed duct insulation boards 46 (glass fiber duct insulation boards or polymeric foam duct insulation boards) from a supply bin into the grooving station 26 where the duct insulation boards 46 pass over the guide roll 36 and between the rotary saw blade cutting assembly 22 and the backing roll 38. The pull rolls 40 and 42 pull the duct insulation boards 46 through the grooving station and maintain the duct boards in proper alignment for the grooving operation even when the duct insulation boards have passed from between the feed rolls 28, 30 and 32, 34. The supply bin can be like or similar to the one disclosed in the '835 patent or like or similar to the supply bin disclosed in U.S. Pat. No. 4,781,510; issued on Nov. 1, 1988; to Manville Service Corporation; and entitled "Insulation Board Feeder"; the disclosure of which is hereby incorporated herein by reference in its entirety.

The rotary saw blade cutting assembly 22 comprises an axle or drive shaft 48; a plurality of rotary saw blades 50 mounted on the drive shaft; and a plurality of spacer sleeves 52 mounted on the drive shaft 48 intermediate the rotary saw blades 50. The drive shaft 48 is rotatably mounted and supported (at each end and at two locations intermediate its ends) by bearings in support arms 54 which depend from a support beam 56. As shown in FIG. 2, the stability of the support arms 54 is reinforced by lateral braces 58. The lateral braces 58 are mounted on a tool bar 60 and bolted or otherwise secured to the support arms 54. By stabilizing the support arms 54 and supporting the drive shaft 48 intermediate its ends with the support arms 54, the drive shaft 48 does not deflect in the middle and the spacing between the saw blades 50 and the peripheral surface of the backing roll 38, which is located directly beneath the cutting assembly 22, can be maintained within very close tolerances across the width of the apparatus thereby contributing to the uniformity of the grooves or kerfs 66 formed in the duct insulation boards 46 by the rotary saw blades 50.

The drive shaft 48 has a non-round transverse cross section, such as an hexagonal or the square cross section shown in FIG. 3. The mounting openings in the rotary saw blades 50 and the spacer sleeves 52 are complementary in cross section to the cross section of the drive shaft 48. Accordingly, the rotary saw blades 50 and the spacer sleeves 52 rotate with the drive shaft and can be readily removed from or placed on the drive shaft 48. As shown in FIG. 1, the support arms 54 keep the spacer sleeves 52 and, consequently, the rotary saw blades 50 from moving axially relative to the drive shaft 48. Since set screws or the like are not needed to affix the saw blades and the spacer sleeves to the drive shaft or to keep the saw blades and spacer sleeves from moving axially relative to the drive shaft 48, the rotary saw blade assembly 22 can be quickly and easily assembled or disassembled to change the spacing between the saw blades for different product runs.

Two sets of spacer sleeves 52 are used to space the saw blades in the rotary saw blade cutting assembly 22 of the present invention. A first set of the spacer sleeves 52 space seventy-five of the rotary saw blades 50 on 1.57 inch ($\pi/2$ inch) centers for grooving duct insulation board to be used in tubular ducts ranging from sixteen to thirty inches in diameter. A second set of the spacer sleeves 52 space thirty-seven of the rotary saw blades 50 on 3.14 inch ($\pi$ inch) centers for grooving duct insulation board to be used in tubular ducts ranging from thirty inches to one hundred inches or more in diameter. The spacer sleeves 52 can be made of metal, plastic or any other suitable material.

As shown in FIG. 4, the teeth 62 of the rotary saw blades 50 alternately project outwardly beyond the planes of the sidewalls 64 of the rotary saw blades and the grooves or kerfs 66 cut by the saw blades 50 are wider than the portions of the saw blades radially inward from the teeth 62. Thus, the sidewalls 64 of the rotary saw blades radially inward of the teeth 62 do not engage the sidewalls of the grooves or kerfs 66 and the drag resulting from such an engagement is eliminated. This reduces the power required to drive the saw blades and allows the saw blades to be driven at higher speeds. When using saw blades having teeth which did not cut grooves wider than the main portions of the saw blade discs, the saw blades were driven at about 500 revolutions per minute. By using the saw blades 50, which have teeth that cut wider grooves or kerfs than the thicknesses of the saw blade discs, in the rotary saw blade assembly 22 of the present invention, the saw blades 50 can be driven at speeds between 1,000 and 2,000 revolutions per minute. By driving the saw blades 50 a higher speeds, duct boards can be passed through the grooving station 26 more rapidly to increase the output of the apparatus 20 and more sharply defined grooves or kerfs 66 are formed in the duct insulation boards.

As shown in FIG. 2, the rotary saw blade cutting assembly 22 is covered by a fiber and dust collection hood 68. The hood 68 comprises three sections which each extend between a pair of the support arms 54 to which the hood sections are bolted or otherwise attached. Each hood section is connected by a hose 70 to a vacuum source (not shown) and collects and disposes of fibers and dust created during the grooving process. By rotating the saw blades 50 clockwise, as shown in FIG. 2, the teeth 62 clear the grooves or kerfs 66 being formed of fibers and dust and carry the fibers and dust up into the fiber and dust collection hood 68 for disposal. By keeping the grooves or kerfs 66 clear of loose fibers and dust, the duct insulation boards 46 curve more readily and the mouths of the grooves or kerfs close when the duct boards are curved to encapsulate the raw surfaces of the grooves within the duct board so that no fibers are exposed to the airstream within the air duct lined with the duct boards 46. The hood 68 also functions as a saw blade guard to protect the machine operator.

As shown in FIGS. 5, 6, 7 and 8, the duct insulation boards 46 each have an airstream surface 72 with the grooves or kerfs 66 formed therein and an outside surface faced with a moisture barrier facing 74, such as, a foil-scrim-kraft facing. When the duct insulation boards 46 are glass fiber boards, the airstream surface 72 is either coated with a coating, such as, a polymeric, acrylic latex coating or faced with a coated, woven or non-woven synthetic fiber mat, such as, a polyester mat coated with a polymeric coating.

The grooves or kerfs 66 each extend across the width of the duct insulation boards and are parallel to each other forming segments 76 which are hinged together by the portions 78 of the duct boards remaining between the bottoms of the grooves or kerfs 66 and the outside surfaces of the duct boards plus the facings 74 on the outside surfaces of the duct boards 46. The grooves or kerfs 66 are narrow, e.g. 3/32 of an inch wide for duct insulation boards up to one and one-half inches thick, and have sidewalls extending perpendicular to the airstream surfaces 72 of the duct boards. The grooves or kerfs 66 may be up to one quarter of an inch wide for duct insulation boards above one and one-half inches thick. The depth of the grooves or kerfs can vary provided the hinge portions 78 remaining are flexible enough to permit the duct boards to be curved to conform to the curvatures of the tubular metal shells 80 into which the duct boards are to be inserted and have the integrity to hold the duct board segments 76 together. The groove or kerf depths are typically between 70% to 90% of the thickness of the duct board e.g. 3/4 of an inch for a one inch thick product.

As shown in FIG. 6, after a duct board is formed into a tube, the edges of the duct board 46 are taped so that the duct board will remain in its tubular configuration until it is placed into the tubular metal shell 80. Once in the tubular metal shell 80, the duct board 46 can be secured to the interior surface of the metal shell by pins or other conventional fastening means. As discussed above, if the internal circumference of the metal shell 80 being lined is greater than the length of a duct insulation board, a portion of one duct insulation board 46 can be taped to another duct insulation board 46 to obtain the required length.

Figure 9:
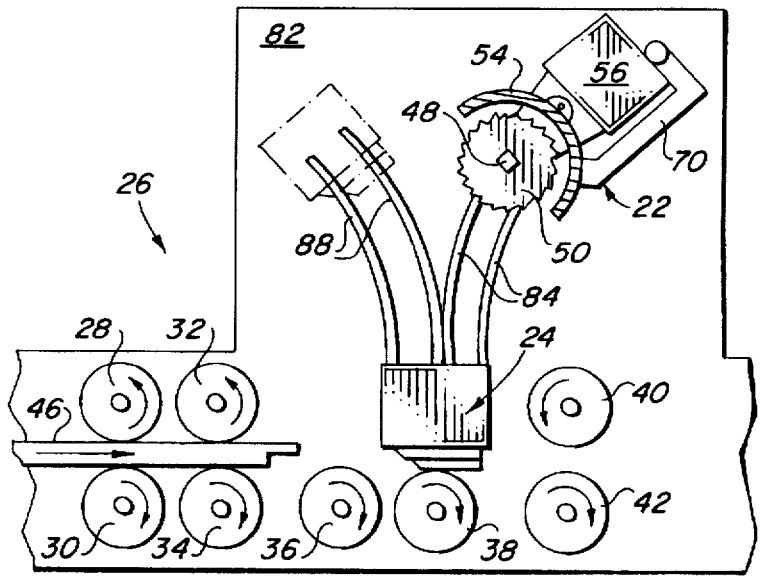
FIG. 9 is a schematic section through the grooving station to illustrate the duct board grooving apparatus with the stationary cutting knife assembly in the grooving position and the rotary saw blade cutting assembly in the storage position.
Figure 10:
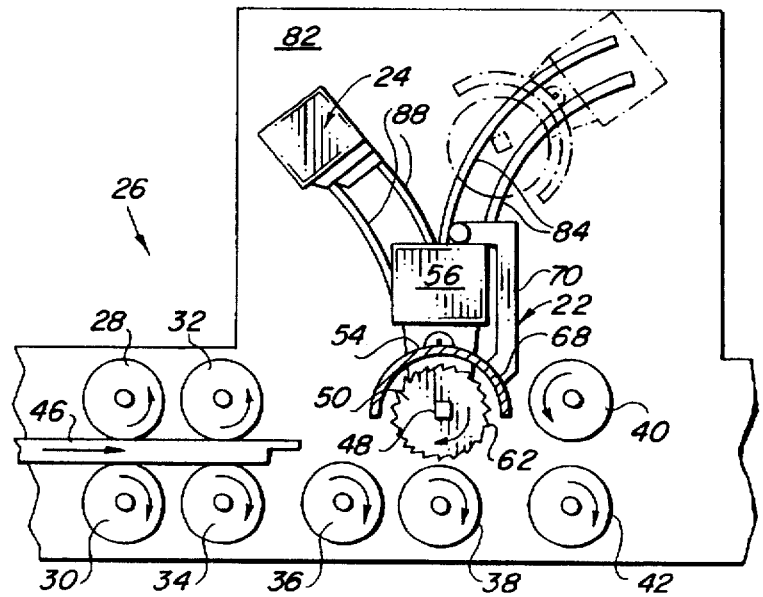
FIG. 10 is a schematic section through the grooving station to illustrate the duct board grooving apparatus with the rotary saw blade cutting assembly in the grooving position and the stationary cutting knife assembly in the storage position.

FIGS. 9 and 10 show an embodiment of the present invention wherein the rotary saw blade cutting assembly 22 and the stationary knife blade grooving assemblies 24 of the '835 patent can be interchangeably placed in a grooving position. In FIG. 9, the stationary knife blade grooving assemblies 24 are located in the grooving position over the backing roll 38 and the rotary saw blade cutting assembly 22 is located in its storage position. In FIG. 10, the rotary saw blade cutting assembly 22 is located in the grooving position directly over the backing roll 38 and the stationary knife blade grooving assemblies 24 are located in their storage position. Each sidewall 82 of the grooving station 26 is provided with a pair of arcuate slots 84 which receive four or more mounting bolts of a bracket supporting one end of the rotary saw blade cutting assembly 22. The bolts can be loosened and retightened to move the rotary saw blade cutting assembly 22 between the grooving position shown in FIG. 10 and the storage position shown in FIG. 9. Each sidewall 82 of the grooving station 26 is also provided with a pair of arcuate slots 88 which receive four or more bolts of a bracket supporting one end of the support beams carrying the stationary knife blade assemblies 24. The bolts can be loosened and retightened to move the stationary knife blade assemblies between the grooving position shown in FIG. 9 and the storage position shown in FIG. 10. It is also contemplated that the rotary saw blade cutting assembly 22 and the stationary knife blade assemblies 24 can be pivotally or otherwise mounted to allow the assembly 22 and the assemblies 24 to be interchangeably located in the grooving position.

In describing the invention certain embodiments have been used to illustrate the invention and the practice thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. In a duct insulation board grooving apparatus comprising: a grooving station for forming grooves in duct insulation boards; grooving means in said grooving station for cutting a plurality of grooves in a major surface of each of said duct insulation boards as said duct insulation boards are fed through said grooving station in a first direction; said grooving means comprising a plurality of rotatably driven, rotary saw blades mounted on an axle and uniformly spaced across said grooving station in a second direction transverse to said first direction; and means for feeding said duct insulation boards in said first direction through said grooving station and past said grooving means whereby a plurality of grooves are formed in said major surface of each of said duct insulation boards; the improvement comprising:

said rotary saw blades being spaced across said grooving station on said axle on 3.14 inch centers and support means supporting said axle intermediate ends of said axle to prevent deflection of said axle in a middle portion of said axle intermediate said ends;

said rotary saw blades being discs having widths defined by side surfaces laying in planes perpendicular to the axis of rotation of said rotary saw blades and having peripheral teeth which project outwardly beyond said planes of said side surfaces to cut grooves in said major surface of each of said duct insulation boards wider than the widths of said rotary saw blades; and said grooving means including a backing roll which is centered beneath said axle on which said rotary saw blades are mounted and supports said duct insulation boards as grooves are being cut in said duct insulation boards by said rotary saw blades.

2. The duct insulation board grooving apparatus of claim 1, wherein: said rotary saw blades are mounted on a rotatable axle having a non-round transverse cross section; and said rotary saw blades each have a central mounting opening therein complementary in configuration to said transverse cross section of said axle whereby said rotary saw blades rotate with said axle.

3. The duct insulation board grooving apparatus of claim 2, including: a first mounting means in said grooving station for moving said grooving means between a groove cutting position and a storage position.

4. The duct insulation board grooving apparatus of claim 3, wherein: said grooving means is a first grooving means; said grooving station has a second grooving means and a second mounting means for moving said second grooving means between a groove cutting position and a storage position whereby one of said grooving means can be placed in said cutting position when said other grooving means is in said storage position.

5. The duct insulation board grooving apparatus of claim 2, wherein: said axle has a square transverse cross section.

6. The duct insulation board grooving apparatus of claim 2, wherein: said rotary saw blades are spaced on said 3.14 inch centers by a plurality of uniform length spacing sleeves having internal cross sections complementary to said transverse cross section of said axle.

7. In a duct insulation board grooving apparatus comprising: a grooving station for forming grooves in duct insulation boards; grooving means in said grooving station for cutting a plurality of grooves in a major surface of each of said duct insulation boards as said duct insulation boards are fed through said grooving station in a first direction; said grooving means comprising a plurality of rotatably driven, rotary saw blades mounted on an axle and uniformly spaced across said grooving station in a second direction transverse to said first direction; and means for feeding said duct insulation boards in said first direction through said grooving station and past said grooving means whereby a plurality of grooves are formed in said major surface of each of said duct insulation boards; the improvement comprising:

said rotary saw blades being spaced across said grooving station on said axle on 1.57 inch centers and support means supporting said axle intermediate ends of said axle to prevent deflection of said axle in a middle portion of said axle intermediate said ends;

said rotary saw blades being discs having widths defined by side surfaces laying in planes perpendicular to the axis of rotation of said rotary saw blades and having peripheral teeth which project outwardly beyond said planes of said side surfaces to cut grooves in said major surface of each of said duct insulation boards wider than the widths of said rotary saw blades; and said grooving means including a backing roll which is centered beneath said axle on which said rotary saw blades are mounted and supports said duct insulation boards as grooves are being cut in said duct insulation boards by said rotary saw blades.

8. The duct insulation board grooving apparatus of claim 7, wherein: said rotary saw blades are mounted on a rotatable axle having a non-round transverse cross section; and said rotary saw blades each have a central mounting opening therein complementary in configuration to said transverse cross section of said axle whereby said rotary saw blades rotate with said axle.

9. The duct insulation board grooving apparatus of claim 8, wherein: said axle has a square transverse cross section.

10. The duct insulation board grooving apparatus of claim 8, wherein: said rotary saw blades are spaced on said 1.57 inch centers by a plurality of uniform length spacing sleeves having internal cross sections complementary to said transverse cross section of said axle.

11. The duct insulation board grooving apparatus of claim 8, wherein: said rotary saw blades are partially covered by a hood means connected to a suction means to collect dust created by forming said grooves in said duct insulation boards; and said hood also functions as a saw blade guard.

12. In a duct insulation board grooving apparatus comprising: a grooving station for forming grooves in duct insulation boards; grooving means in said grooving station for cutting a plurality of grooves in a major surface of each of said duct insulation boards as said duct insulation boards are fed through said grooving station in a first direction: said grooving means comprising a plurality of rotatably driven, rotary saw blades uniformly spaced across said grooving station in a second direction transverse to said first direction; and means for feeding said duct insulation boards in said first direction through said grooving station and past said grooving means whereby a plurality of grooves are formed in said major surface of each of said duct insulation boards; the improvement comprising:

said rotary saw blades being spaced across said grooving station on 1.57 inch centers.

13. The duct insulation board grooving apparatus of claim 8, including: a first mounting means in said grooving station for moving said grooving means between a groove cutting position and a storage position.

14. The duct insulation board grooving apparatus of claim 13, wherein: said grooving means is a first grooving means; said grooving station has a second grooving means and a second mounting means for moving said second grooving means between a groove cutting position and a storage position whereby one of said grooving means can be placed in said cutting position when said other grooving means is in said storage position.

15. In a duct insulation board grooving apparatus comprising: a grooving station for forming grooves in duct insulation boards; grooving means in said grooving station for cutting a plurality of grooves in a major surface of each of said duct insulation boards as said duct insulation boards are fed through said grooving station in a first direction; said grooving means comprising a plurality of rotatably driven, rotary saw blades uniformly spaced across said grooving station in a second direction transverse to said first direction; and means for feeding said duct insulation boards in said first direction through said grooving station and past said grooving means whereby a plurality of grooves are formed in said major surface of each of said duct insulation boards; the improvement comprising:

said rotary saw blades being spaced across said grooving station on 3.14 inch centers.

16. The duct insulation board grooving apparatus of claim 2, wherein: said rotary saw blades are partially covered by a hood means connected to a suction means to collect dust created by forming said grooves in said duct insulation boards; and said hood also functions as a saw blade guard.

* * * * *